June 9, 1936.  C. S. BRAGG ET AL  2,043,732
BRAKE MECHANISM FOR AUTOMOTIVE VEHICLES
Original Filed May 19, 1925   2 Sheets-Sheet 2
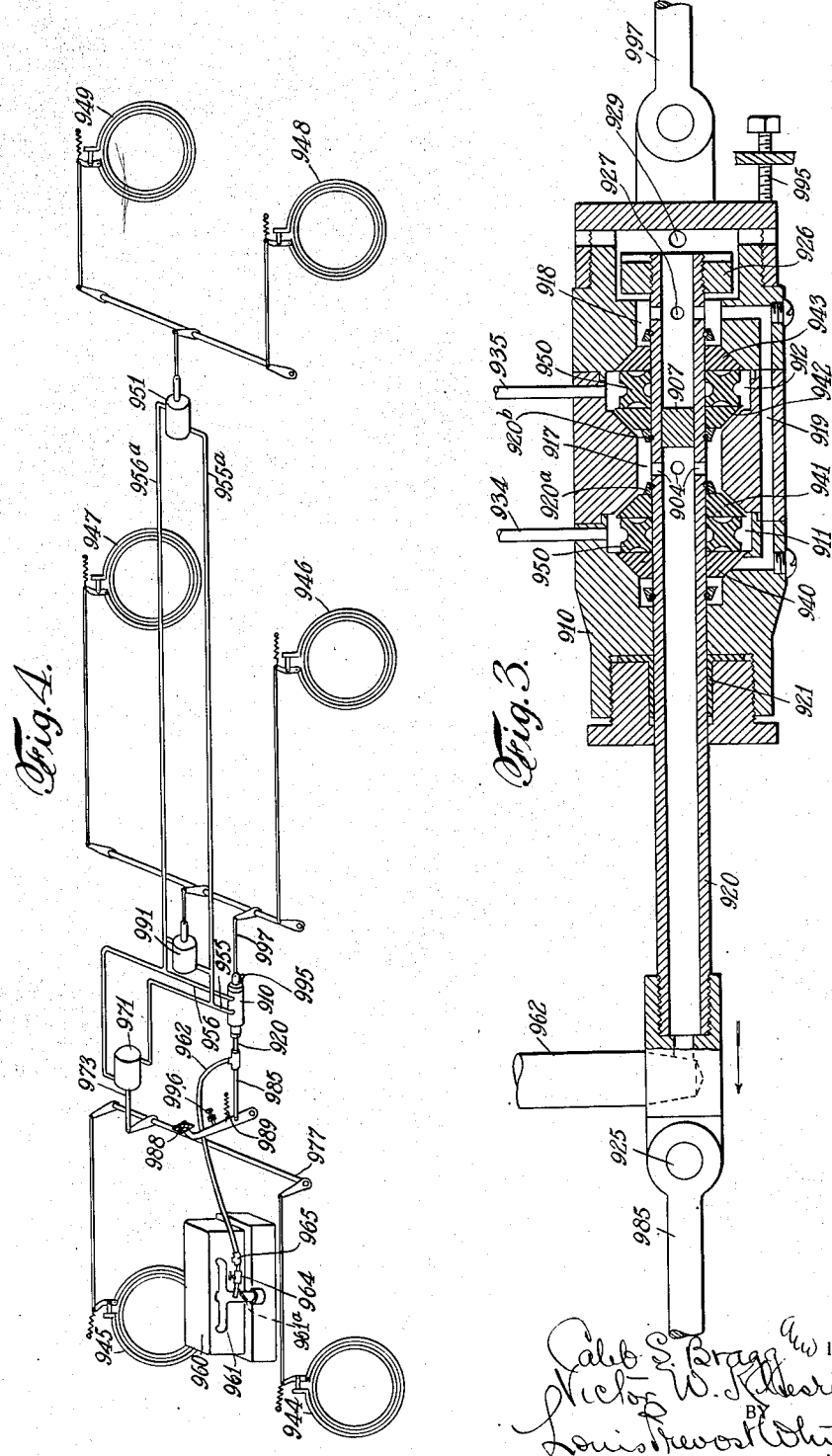

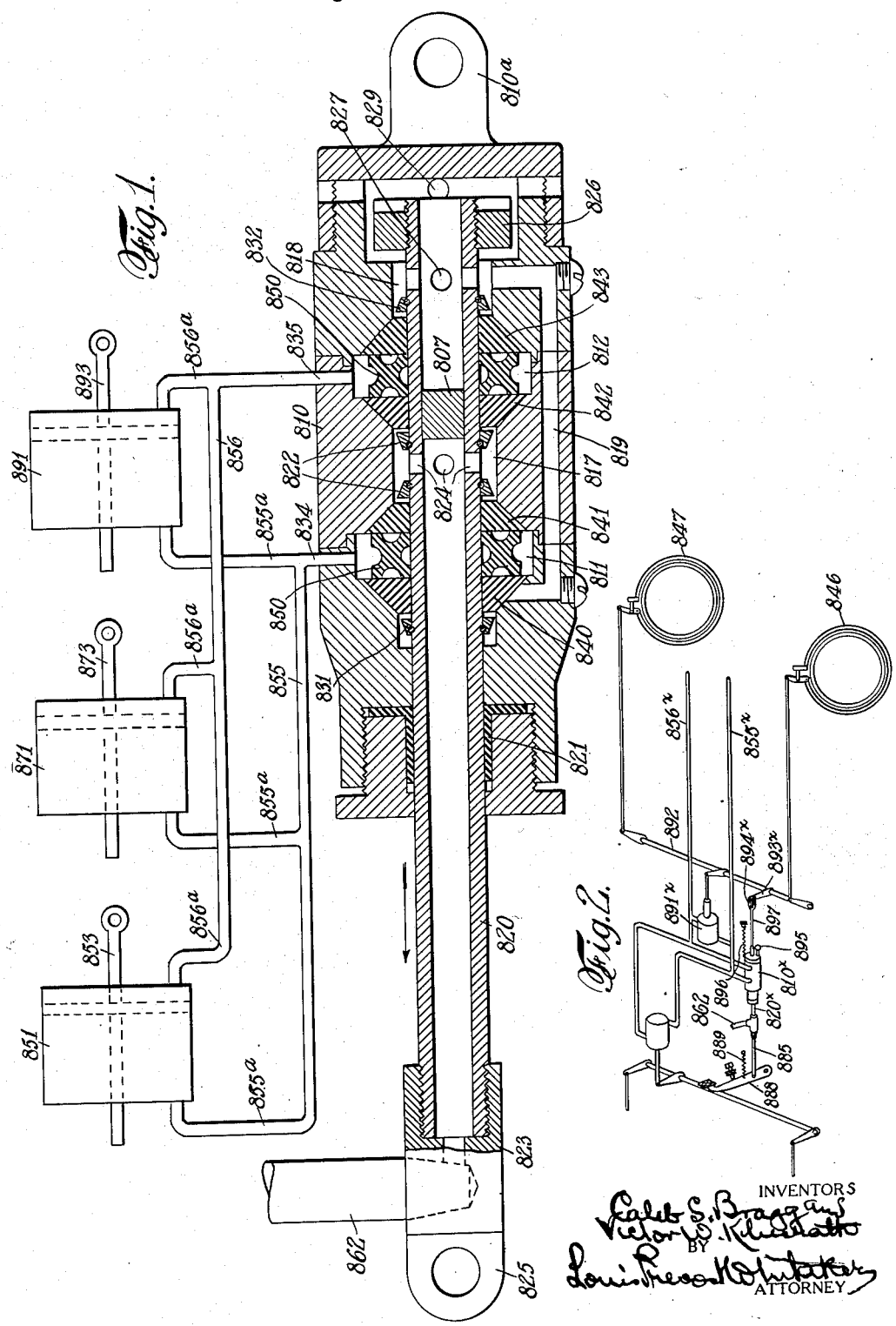

Patented June 9, 1936

2,043,732

UNITED STATES PATENT OFFICE 2,043,732

BRAKE MECHANISM FOR AUTOMOTIVE VEHICLES

Caleb S. Bragg, Palm Beach, Fla., and Victor W. Kliesrath, South Bend, Ind., assignors to Bragg-Kliesrath Corporation, Long Island City, N. Y., a corporation of New York Original application May 19, 1925, Serial No. 31,281, now Patent No. 1,826,414, October 6, 1931. Divided and this application January 25, 1927, Serial No. 163,351. Renewed November 10, 1933

32 Claims. (Cl. 188—152)

Our invention consists in the novel features hereinafter described, reference being had to the accompanying drawings, which illustrate several embodiments of the same, selected by us for purposes of illustration, and the said invention is fully disclosed in the following description and claims.

This application is a division of our former application for Letters Patent of the United States, filed on or about May 19, 1925, and given Serial No. 31,281 which issued as Patent #1,826,414 on October 6, 1931.

Our invention is an improvement in power actuated brake mechanism for vehicles, and is specially adapted for use with automotive vehicles propelled by an internal combustion engine, which in its normal operation, provides continually differential pressures, which can be availed for operating the power actuators employed in connection with the brake mechanism of the vehicle. Our present invention is especially adapted for operating the brake mechanism of heavy automotive vehicles, such as trucks and busses, in which the power required to apply all of the brake mechanism for the vehicle, which may have four, six or even more wheels, is beyond the ordinary physical strength of the operator, and our present invention is also readily adaptable to installations in which a main automotive vehicle is provided with a trailing vehicle, or trailer, propelled by the main vehicle, so that the brake mechanism of both vehicles shall be under the control of the operator of the main vehicle.

According to our present invention, we provide a plurality of power actuators, each comprising a cylinder and piston therein, preferably a double acting piston, the pistons of the several actuators being connected to different brake mechanisms of the vehicle, or vehicles, or to different groups of brake mechanisms of the vehicle or vehicles, the cylinders of said actuators being connected with a single controlling and reversing valve mechanism, which is exterior to and separate from the cylinders of all the actuators and comprises a valve casing, valves, and a longitudinally movable valve actuating part, the said valve casing and actuating part being located in linkage extending between an operator operated part for the valve mechanism and one of said brake mechanisms, or one group of said brake mechanisms, a limited amount of lost motion being provided between the valve actuating part and the valve casing, so that the operator may apply his physical force to the brake mechanism with which the operator operated part is connected, in addition to the force which is exerted by the power actuator connected therewith, who may also operate said brake mechanism by his physical force alone, in case of failure of power for any reason. The valve casing is connected with all of the separate actuator cylinders, to effect the simultaneous operation thereof, and is also connected with sources of higher and lower pressures, being preferably connected with the suction passage of the internal combustion engine which propels the vehicle, or vehicles, between the throttle valve and the cylinders, for example, the intake manifold, as the source of lower pressure, and with the atmosphere as the source of higher pressure. Our invention also contemplates provision of means whereby the pistons of the several actuators are maintained normally submerged in vacuum, so that all power strokes of the piston to apply the brake mechanism, may be produced by merely admitting atmospheric air into the cylinders in rear of the pistons, without admitting any appreciable quantities of air into the intake manifold, thereby preventing the interference with the operation of the engine, or the possibility of stalling it if idling, this air so admitted being afterwards withdrawn through the return strokes of the piston, and the suction pipe being provided preferably with an adjustable regulating or restricting valve, to prevent the air withdrawn at any time from the actuators from reaching the intake manifold in sufficiently large quantities at a time to interfere with the operation of the engine, or stall it if idling. This result is preferably effected by maintaining the suction valves of the valve mechanism normally in open position to connect the cylinders of the several actuators on both sides of the pistons in each, with the intake manifold, and this valve mechanism will also have the effect of producing an equilization of pressures, whenever the valves are brought into neutral or normal position to permit a return movement of the pistons after they have been actuated, to apply the brakes, under the draft of the brakes and their retracting springs.

In the accompanying drawings, which illustrate two embodiments of our invention.

Fig. 1 is an enlarged view of a valve mechanism, independent of any actuator structure, showing it connected with a plurality of valveless actuators for simultaneously controlling the same, the valve mechanism being arranged to be connected in the linkage between the pedal lever and certain brake mechanism.

Fig. 2 is a diagrammatic view showing an installation of the valve mechanism illustrated in Fig. 1, in an automotive vehicle for operating the brake mechanism thereof.

Fig. 3 is a view similar to Fig. 1, with the actuator cylinders omitted, showing a slightly modified form of valve mechanism constructed to maintain a partial vacuum on both faces of the piston of each actuator connected therewith, when the valve mechanism is in its normal or off position.

Fig. 4 is a diagrammatic view showing an installation in a six wheel vehicle, including a plurality of valveless actuators and the independent controlling valve mechanism illustrated in Fig. 3, for example.

In Fig. 1 we have shown several separate valveless actuators, indicated at 851, 871 and 891, the pistons of which are adapted to be connected with independently operable valve mechanisms, of an automotive vehicle, for example, said actuators being controlled by valve mechanism located entirely outside of all of the actuators, and preferably in linkage between the operator operated part for the valve mechanism, and the brake mechanism connected with one of the actuators. As indicated in this figure, the valve mechanism is contained in a housing, 810, in which are formed the suction chamber, 817, and valve chambers, 811 and 812, provided with oppositely disposed valves, 840, 841, 842 and 843, of which the valves, 841 and 842 are the suction valves controlling the communication between the suction chamber and the adjacent valves chambers, and the valves, 840 and 843, are air inlet valves, or higher pressure inlet valves, controlling the communication between the valve chambers and an air inlet chamber, 818, which is in communication with the atmosphere, through an aperture, 829, at one end of the casing, said chamber, 818, which is adjacent to the valve, 843, being in this instance connected by a by-pass, 819, with the seat of the valve, 840, communicating with the valve chamber, 811. The valves are preferably made of molded rubber, or other suitable material, and are provided with central apertures to engage a longitudinally movable valve actuating sleeve, 820, extending through a stuffing box, 821, in one end of the valve casing, and through the casing and valves, said valves fitting the sleeve tight enough to make an air tight connection, while permitting the longitudinal movement of the sleeve therethrough. The valve sleeve is preferably divided internally into two parts by means of a plug or partition, 807, the interior of the sleeve at one side of the partition (at the left in Fig. 1) being connected with the suction chamber by apertures, 824, and the other portion of the sleeve being provided with apertures, 827, communicating with the higher pressure chamber, or air chamber, 818, and with the atmosphere, by the aperture, 829. The valves are held seated by elastic cushioning device, 850, of rubber or other suitable material, interposed between the pairs of valves in the respective valve chambers, as shown, and which may also fit the sleeve, 820, so as to assist in sealing the central apertures in the valve. Each of the valve chambers, 811, and 812, is provided with a port or passage, 834, 835, respectively, each of which is connected to the same side of each of the cylinders of the separate actuator by means of pipes, 855 and 855ª, and pipes, 856, 856ª, respectively. The actuating sleeve is provided with suitable means for opening one valve of each pair, that is to say, the suction valve of one pair, and the air inlet valve of the other pair, when moved in either direction. As shown in Fig. 1, this function is performed by collars, 822, secured to the sleeve between the suction valves, 841 and 842, and collars 831 and 832, secured to the sleeve on the outer side of the valves, 840 and 843, respectively. In this instance we have shown a construction especially adapted for operation by suction produced by the suction from the suction passage, and therefore the interior of that portion of the sleeve, 820, which communicates with the suction chamber, 817, is adapted to be connected with a suction pipe, indicated at 862, which leads in this instance to the intake manifold of the internal combustion engine, and connects the interior of the sleeve and the suction chamber with said passage between the throttle valve and the engine cylinders. A portion of this pipe, 862, is preferably flexible, to permit of the longitudinal movements of the sleeve, 820, and is conveniently connected to a cap, 823, provided with an ear, 825, for attaching it to an operator operated part. The rear end of the sleeve, 820, is provided with a collar, 826, located in a recess in the housing, which provides for a limited amount of lost motion between the sleeve and housing, sufficient to operate the valves by longitudinal movements of the sleeve in either direction. The housing, 810, is also provided with a lug, 810ª, by means of which it may be connected, if desired, to a fixed portion of the chassis, in which case the connecting pipes, 855, may be rigid pipes. In some instances we may connect the housing by means of the lug, 810ª, by suitable linkage to one or other of the brake mechanisms of the vehicle, so that the forward movement of the valve sleeve, 820, will not only operate the valve mechanism, so as to effect the operation of the auxiliary actuator, but as soon as the lost motion between the sleeve and housing is taken up, the force of the operator's foot will be directly applied to the brake mechanism connected to the housing. In this case it is necessary that the pipes, 855 and 856 shall be connected to the housing, 810, by flexible sections to permit of the necessary longitudinal movement of the housing. The upper portion of Fig. 1, illustrating the auxiliary actuators, is diagrammatic, and it will be understood that the piston rods of the several auxiliary actuator pistons, indicated at 853, 873, and 893, respectively, will be connected to parts of the brake mechanism with which the vehicle may be provided, and that the pistons of all of these auxiliary actuators will be responsive to the valve mechanism contained in the housing.

Assuming that the casing, 810, is connected in the linkage to one of the brake mechanisms as above stated, the operation of the device will be as follows. In the initial position of the valve mechanism in the housing, the valve sleeve will be held in its rearmost position by the retracting spring of the foot lever, and the valves, 840—842, will be held open, connecting the rear end of each auxiliary actuator cylinder with suction, and the forward end thereof with the atmosphere, by way of the by-pass, 819. The first pressure on the foot lever will cause the sleeve, 820, to move forward, allowing the valves, 840 and 842, to close, and the further forward movement of the sleeve, 820, will open the valves, 841 and 843, connecting each of the auxiliary cylinders on the end forward of the piston with suction, and admitting atmospheric pressure to the cylinders in rear of the piston, and thereby causing the piston in each of said auxiliary actuator cylinders, to move in a direction to apply the brakes. As the valve casing, 810, and the valve actuating sleeve, 820, are connected, as before stated, in the linkage between the pedal lever and one of the brake mechanisms operated by one of the actuator pistons, it will be obvious that the valve casing and foot lever will move forward as the brakes are applied and until they are applied to the full extent of the power of the actuator or actuators connected therewith, and the extent of the forward movement of the pedal lever will necessarily depend upon the distance between the friction surfaces of the brake mechanism with which it is operatively connected, so that the extent of movement of the lever will indicate to the operator the extent to which the brakes are being applied by power and also the amount of wear on the friction surfaces, and obviously the pedal lever must always be capable of further movement after the brakes have been fully applied by power. If this pressure should not be sufficient for braking purposes, and further braking power is needed, the operator, by further depressing the foot lever and transferring his physical power to the housing 810 through the collar, 826, can apply additional power to the brakes connected to the valve casing, or housing, 810. On releasing the foot lever, the retracting spring causes the valve actuating sleeve to move backward faster than the casing, thus closing the valves, 841 and 843, and opening the valves, 840 and 842, and releasing the brakes.

In Fig. 3 we have shown a modification of the valve structure illustrated in Fig. 1, and an installation containing the same is illustrated in Fig. 4. The various parts of the valve mechanism and installation are given the same numerals as have been used heretofore, with the addition of 900, in order to avoid confusion. In this valve mechanism shown in detail in Fig. 3, the two centrally located valves on opposite sides of the suction chamber, 917, to wit, the valve, 941 and 942, are so constructed and arranged with reference to the valve actuating sleeve, 920, that when the parts are in normal or off position, the valves, 941 and 942, will both be held open, thereby producing a partial vacuum or rarification in each of the actuator cylinders, 951, 971 and 991, connected therewith, on both sides of the pistons therein. In order to accomplish this result, we prefer to provide an adjustable stop, indicated at 995, for limiting the return movement of the valve housing, under the action of the retracting means for the brake mechanism, when the brakes are released, so that it will be brought to rest always at the same point, and we also provide means for arresting the return movement of the valve actuating sleeve, 920. As the return movement of the valve sleeve is usually effected by the retracting spring, 989, of the foot lever, we conveniently provide an adjustable stop, 996, for arresting the foot lever under the action of its retracting spring, and thereby limiting the return movement of the valve actuating sleeve, 920, in a direction opposite to that indicated by the arrow in Fig. 3. The actuating collars, 920ᵃ and 920ᵇ, on the valve actuating sleeve, 920, which effect the opening movements of the valves, 941 and 942, are so located that when the valve casing, 910, is arrested by the stop, 995, and the valve actuating sleeve is arrested by the engagement of the foot lever, 988, with its stop, 996, in the normal or off position of the apparatus, the valves, 941 and 942, will, as before stated, be both held in open position, as indicated in Fig. 3, so that the suction through the suction pipe, 962, sleeve, 920, and suction chamber, 917, will produce a rarified condition on both sides of the piston in each of the valveless actuators connected with the valve mechanism. When the foot lever is moved forward, therefore, the valve actuating sleeve, 920, will move in the direction of the arrow in Fig. 3, with the result that the valve, 941, will be opened further, the valve, 942, will be permitted to close under the action of its cushioning and sealing means, 950, after which the valve, 943, will be opened, thus continuing the communication between the suction chamber and the forward side of each cylinder of the actuators connected with the valve mechanism, and admitting atmospheric air in rear of each piston, and effecting the operation of the brakes connected with the several actuators without admitting any appreciable quantity of air to the intake manifold. As illustrated in Fig. 4, the valve casing, 910, is connected by a link, 997, with the brake mechanism operated by the valveless actuator, 991, and as the nut or enlargement, 926, on the sleeve, 920, within the recess in the valve body provides lost motion between the sleeve, 920, and the valve casing, the operator may, by further depressing the foot lever after the actuator has operated to its fullest extent, add his physical force to any of the brake mechanisms (in this instance the brakes, 946, 947), which are connected with the foot lever. The forward movement of the piston being accompanied by the corresponding forward movement of the valve body, 910, the latter is drawn away from the stop, 995. After the brakes are applied, the operator by slightly relieving the pressure of his foot on the brake pedal may effect a slight rearward movement of the pedal sleeve with respect to the valve body, closing valve, 943, and slightly opening suction valve, 942, without completely closing the suction valve, 941. This permits an equalization of pressures within the cylinders, which are thereby connected on both sides of their pistons with the suction pipe, so that a portion of the air previously admitted for an application of the brakes is exhausted, and the brakes are permitted to release themselves by the draft of the brakes and their retracting springs. If the operator again moves the foot lever forward sufficiently to close the suction valve, 942, and opening the air inlet valve, 943, the brakes will be again applied, and the brakes may be relieved and re-applied in this manner as often as desired, as in descending a long grade, and in traffic, while the driver maintains his foot on the pedal lever. To restore the brakes to their normal position, the driver will remove his foot from the brake pedal when the retracting spring therefor will shift the valve sleeve, 920, rearwardly so as to close the valve, 943, and open the suction valve, 942, equalizing pressure in the cylinders on opposite faces of the pistons, and permitting the brakes to release themselves as before described, the valve sleeve, in this instance, continuing its rearward movement with respect to the valve body to the extent permitted by the lost motion connection, and closing suction valve, 941, and opening the air inlet valve, 940. This cuts off the portions of the cylinders forward of the piston from the suction pipe and admits air at atmospheric pressure thereto, thus positively returning the pistons, brake mechanisms, and the valve body to their normal positions. As the parts return to their normal or off positions, the foot lever will be arrested by the stop, 996, thereby stopping the return movement of the sleeve, 920, and as the valve body comes to rest against the stop, 995, the valves, 941 and 942, will be held in open position, thereby equalizing the pressures in the cylinders of the valveless actuators, and producing rarification on both sides of the pistons therein.

In the preceding description of Figs. 3 and 4, we have used the term "forward" as meaning a movement of the actuator piston in a direction to apply the brake, and "rearward" as meaning a movement of the actuator piston in a direction to release the brake.

In case of failure of power, the operator may nevertheless apply the brake mechanisms connected with the foot lever by physical power, as the first movement of the foot lever will move the valve mechanisms into position to vent the cylinders.

In some instances where we employ reversing valve mechanism of the kind shown in Fig. 1, independent of any actuator piston, for controlling one or more valveless actuators, we may provide the valve casing with a retracting spring of its own for holding it normally against a stop and connect the valve casing to certain of the brake mechanism, by linkage providing for a certain amount of lost motion of the foot lever, so that very slight movements of the foot lever, sufficient only to operate the valve mechanism will apply the brakes operated by the valveless actuators, the valve casing not moving forward ordinarily with the brake mechanism. When, however, it is desired to apply the physical force of the operator to the brake mechanism operatively connected with the valve casing, this may be accomplished by pressing the foot lever forward sufficiently to take up the lost motion in the connections between the valve casing and the brake mechanism.

We have illustrated diagrammatically such an arrangement in Fig. 2 in which 810$^x$, represents the valve casing containing reversing valve mechanism, such, for example, as illustrated in Fig. 1. 820$^x$ represents the valve actuating sleeve connected by the link, 885, with the foot lever, 888, provided with the usual retracting spring, 889, valve mechanism being connected by pipes, 855$^x$ and 856$^x$, having flexible connections where necessary, with one or a plurality of valveless actuators, in the manner illustrated, for example, in Fig. 1, or in Fig. 4, one of such actuators, 891$^x$, being connected to a rock shaft for controlling brake mechanism, illustrated at 846, 847, for example, to which it is also desired to connect the valve casing, 810$^x$. The valve casing, 810$^x$ is connected by a link, 897, with an arm, 893$^x$, on the rock shaft, 892, and said link, 897, is provided with a slot, 894$^x$, to allow for a certain amount of lost motion. In this instance the valve casing, 810$^x$, is provided with a retracting spring, 896, connected therewith, and normally holding the casing back against the stop, 895, when the parts are in the off position. In this instance the valve casing may be supported vertically in any desired way, which will permit the necessary longitudinal movement of the valve casing, when desired.

The parts being in the off position, as indicated in Fig. 2, it will be obvious that the operator can, by a very slight movement of the foot lever, sufficient only to operate the valve mechanism, effect the operation of all the valveless actuators connected with the valve mechanism and apply all of the brakes operated thereby and release the same, as the lost motion provided in this instance by the slot, 894$^x$, will permit the brakes connected with the link, 897, to be operated by the actuator, 891$^x$, without any forward movement of the valve casing, 810$^x$, which, therefore, does not follow the movement of the foot, unless it becomes desirable for any reason to apply the physical force of the operator to the brake mechanism operatively connected with the foot lever through the valve actuating sleeve, 820$^x$, and the linkage from the valve casing to such brake mechanism, in which case the foot lever can be depressed sufficiently to take up the lost motion provided by the slot, 894$^x$, thus moving the valve casing, 810$^x$, bodily forward with its link, 897, and enabling the operator to apply his physical force to the brake mechanism connected with such linkage, as the brake mechanism, 846, 847, in addition to the power exerted by the valveless actuator connected therewith, or in case of failure of power, in which case the movement of the reversing valve mechanism will vent the valveless actuators, so that the piston in the actuator, 891$^x$, will offer practically no resistance to the application of the brakes under such conditions. As clearly illustrated in both Fig. 2 and Fig. 4, we have shown a plurality of valveless actuators operatively connected with brake mechanisms respectively for different pairs of wheels of the vehicle, as the steering wheels and the non-steering wheels, and operating simultaneously under the control of the exterior valve mechanism operated by the foot lever which is connected by means providing lost motion, with the brake mechanisms for certain wheels of the vehicle less than the whole number, the valve mechanism being in this instance located in linkage between the foot lever and certain of the brake mechanisms which are preferably as shown, brake mechanisms for non-steering wheels. In Fig. 4 for example, we have shown three power actuators each connected with brake mechanisms for one pair of wheels, including the steering and non-steering wheels, and simultaneously controlled by an exterior valve mechanism located in linkage between the foot lever and the brake mechanisms for one pair of wheels, to wit, the rear or non-steering wheels. It will thus be seen that in any of the constructions shown, all of the brake mechanisms will be applied by power simultaneously under the control of the single exterior valve mechanism, and if additional power is desired, the operator can add his physical force to certain brake mechanisms less than the whole number, as for example in this instance the brake mechanisms for certain of the non-steering wheels of the vehicle.

As indicated in Fig. 4, the suction pipe which connects the suction chamber of the valve mechanism in either form of the invention, with the intake manifold between the throttle valve, indicated at 961$^a$ in Fig. 4, and the engine cylinders, is preferably provided with an adjustable restricting or regulating valve, 964, adjacent to the intake manifold, and a check valve, 965, between the manifold and the valve sleeve, constructed and operating in the manner set forth in our former application for Letters Patent of the United States filed January 5, 1925, and given Serial No. 506 which issued as Patent #1,879,598 on Sept. 27, 1932. The restricting valve prevents the admission of air at any time to the intake manifold in such large quantities as to interfere with the operation of the engine or stall it if idling, and the check valve prevents explosive mixture from being drawn into the valve mechanism, or actuators, and also tends to maintain in the actuator cylinders when the same are normally connected on both sides of their pistons with the intake manifold, as previously described, the maximum degree of rarification obtained in the suction passage of the engine between operations of the actuators.

What we claim and desire to secure by Letters Patent is:—

1. For use with an automotive vehicle a power operating mechanism having in combination a power actuator comprising a cylinder and a double acting piston therein, operative connections between the piston and a movable part of the vehicle, reversing valve mechanism exterior to said actuator, and comprising a valve casing movable with respect to the actuator, and movable valves in said casing, operative connections between said valve mechanism and said actuator cylinder, means for subjecting the opposite faces of the actuator piston to differential pressures under the control of said valve mechanism, a connection from said valve casing to said movable part of the vehicle, an operator operated part, operative connections from said part to the reversing valve mechanism providing lost motion between said connections and the valve casing, whereby said operator operated part may be moved to operate the said valves and effect the movement of said movable part by the actuator, and whereby by a movement of the operator operated part sufficient to take up said lost motion, the physical force of the operator may be applied to the movable part of the vehicle.

2. For use with an automotive vehicle provided with an internal combustion engine having a suction passage, a power operating mechanism having in combination, a power actuator comprising a cylinder and a double acting piston therein, reversing valve mechanism exterior to the power actuator operative connections between said valve mechanism and said power actuator cylinder, a vacuum pipe for connecting said valve mechanism with the said suction passage of the engine, said valve mechanism being provided with an inlet for higher pressure fluid, said valve mechanism being constructed to maintain a partial vacuum on both sides of the piston in the actuator cylinder when the piston is in retracted position, and an operator operated part connected with a movable part of said valve mechanism.

3. For use with an automotive vehicle provided with an internal combustion engine having a suction passage, a power operating mechanism having in combination, a power actuator comprising a cylinder and a double acting piston therein connected with a movable part of the vehicle, reversing valve mechanism exterior to said actuator cylinder and including a movable valve casing provided with ports connected with said cylinder on opposite sides of the piston, movable valves in said casing, a suction pipe connecting said valve casing with the suction passage of the engine, means for admitting a higher pressure fluid to the valve casing, an operator operated part connected with the movable valves, and means for holding said valves in position to connect said suction pipe with the actuator cylinder on both sides of the piston when the parts are in normal or off position, and connections between said valve casing and said movable part of the vehicle.

4. For use with an automotive vehicle provided with an internal combustion engine having a suction passage, a power operating mechanism having in combination, a power actuator comprising a cylinder closed at both ends, and a double acting piston therein connected with a movable part of the vehicle, reversing valve mechanism exterior to said actuator cylinder and including a longitudinally movable valve casing provided with ports connected with said cylinder on opposite sides of the piston, movable valves in said casing, a suction pipe connecting said valve casing with the suction passage of the engine, means for admitting a higher pressure fluid to the valve casing, an operator operated part, connections therefrom to said movable valves, means for holding said valves in position to connect said suction pipe with the actuator cylinder on both sides of the piston when the parts are in normal or off position, including a stop for limiting the rearward movement of the valve casing, and a stop for limiting the rearward movement of the operator operated part and said valve actuating connections, connections from said valve casing to said movable part of the vehicle, and retracting means for the valve casing.

5. For use with an automotive vehicle, a power operating mechanism having in combination, a power actuator comprising a cylinder and a piston therein, controlling valve mechanism exterior to said cylinder and comprising a valve casing operatively connected with said actuator cylinder and movable with respect thereto, and movable reversing valves in said valve casing, means for establishing differential pressures in said actuator cylinder on opposite sides of the piston under the control of said valve mechanism, an operator operated part connected with said movable reversing valves and operatively connected with the valve casing by means permitting lost motion, operative connections from the actuator piston to a movable part of the vehicle, operative connections from said valve casing to said movable part, retracting means for said valve casing, and a stop for limiting the movement thereof under said retracting means, whereby slight movements of the operator operated part sufficient to move the valve mechanism with respect to the movable valve casing will effect the control of the movable part by the actuator, and whereby a greater movement of the operator operated part will permit the application of the physical power of the operator to said movable part in addition to the power of the actuator, or in case of failure of power.

6. For use with an automotive vehicle provided with an internal combustion engine, having a suction passage, a power operating mechanism having in combination, a power actuator comprising a cylinder and a piston in said cylinder, and connections between said piston and a movable part of the vehicle, of an operator operated part, operative connections between said part and said movable part of the vehicle with which said piston is connected and comprising a longitudinally movable valve casing, fluid connections from said valve casing to the actuator cylinder, movable valves in said valve casing, and means for connecting said actuator cylinder with the suction passage of the engine, and with a source of higher fluid pressure under the control of said valve mechanism, a valve actuating part extending through the valve casing and valves, said valve actuating part being connected with the valve casing by means permitting lost motion, said valve actuating part and the valve casing being connected the one with the movable part and the other with the operator operated part.

7. A brake system for automotive vehicles comprising in combination a plurality of brake mechanisms, a plurality of power actuators, each having a cylinder and a piston therein, means for connecting each of said pistons with certain brake mechanisms of the vehicle, and exterior valve mechanism comprising a valve casing connected with all of said actuator cylinders, and valves movable with respect to said casing, a valve actuating part having a limited relative movement with respect to said casing, an operator operated part, said valve casing and said valve actuating part being the one connected with the operator operated part and the other with certain of said brake mechanisms less than the whole number, to enable the operator to apply all of said brake mechanisms simultaneously by power, and apply his physical force to the brake mechanisms so connected with the operator operated part in addition to the power of the actuator connected therewith, or in case of failure of power.

8. A brake system for automotive vehicles, comprising in combination a plurality of brake mechanisms, a plurality of power actuators, each having a cylinder and a piston therein, means for connecting each of said pistons with certain brake mechanisms of the vehicle, means for simultaneously establishing differential pressure on the opposite faces of said pistons, including a single controlling valve means located exterior to and remote from all of said actuators, and constructed to maintain said pistons in a balanced condition when said valve means is in an interjacent position between its limits of movement, said valve means including a valve casing exterior to and movable with respect to said cylinders, and valve mechanism movable with respect to said casing, a valve actuating part operatively connected with said movable valve mechanism and having a limited relative movement with respect to the casing, an operator operated part, said valve casing and valve actuating part being the one connected with the operator operated part and the other with certain of said brake mechanisms less than the whole number, to enable the operator to apply all of said brake mechanisms by power and to apply his physical force to the brake mechanisms only which are connected with the operator operated part, in addition to the power of the actuator, or in case of failure of power.

9. A brake system for automotive vehicles, comprising in combination a plurality of brake mechanisms, a plurality of power actuators, each having a cylinder closed at each end, and a piston in said cylinder, means for connecting each of said pistons with brake mechanisms for the vehicle, means for simultaneously establishing differential fluid pressures on opposite faces of said pistons, including a single reversing valve mechanism located exterior to said cylinders, and constructed to maintain said pistons in a balanced condition when the reversing valve mechanism is in an interjacent position between its limits of movement, an operator operated part for said valve mechanism, said valve mechanism comprising relatively movable parts having limited relative movement, one of said parts being connected to the operator operated part and the other of said parts being connected to certain of said brake mechanisms less than the whole number, to enable the operator to operate all of said brake mechanisms simultaneously by power, and to apply his physical force to the brake mechanisms only which are connected to the operator operated part, in addition to the power of the actuator connected therewith, or in case of failure of power.

10. A brake system for automotive vehicles provided with an internal combustion engine having a throttle controlled suction passage, comprising in combination, a plurality of independently operable brake mechanisms, a plurality of actuators, each comprising a cylinder closed at both ends and a piston, a single controlling valve mechanism for said actuators located exterior to all of said cylinders, means for connecting all of said actuator cylinders simultaneously with the suction passage of the engine between the throttle valve and the engine cylinders, and with a source of higher fluid pressure under the control of said valve mechanism, connections from each of said pistons to said independently operable brake mechanisms, said valve mechanism comprising relatively movable parts, an operator operated part connected with one of said relatively movable parts, connections from the other of said parts to certain of said brake mechanisms less than the whole number for enabling the operator to apply his physical force to the brake mechanisms only connected with the operator operated part, and means for holding the valve mechanism when in released position, in position to connect each of said cylinders simultaneously and on both sides of the piston therein with the suction passage of the engine, to maintain said piston submerged in vacuum.

11. A brake system for automotive vehicles provided with an internal combustion engine having cylinders and having a throttle controlled suction passage, comprising in combination a plurality of brake mechanisms, a plurality of actuators, each having a cylinder and piston, a single controlling valve mechanism for said actuators located exterior to all of said cylinders, means for connecting all of said actuator cylinders simultaneously with the suction passage of the engine between the throttle valve and the engine cylinders, and with a source of higher fluid pressure under the control of said valve mechanism, connections from each of said pistons to independently operable brake mechanisms, said valve mechanism being movable with respect to said cylinders, and comprising among its members relatively movable parts, an operator operated part, connections therefrom to one of said relatively movable parts, connections from the other of said relatively movable parts to certain of said brake mechanisms, means for limiting the relative movement of said parts to enable the operator to apply his physical force to the brake mechanisms connected with the valve mechanism, and said valve mechanism being constructed to effect the simultaneous movement of all of said pistons and brake mechanisms connected therewith simultaneously to an extent corresponding with the movement of the operator operated part.

12. A brake system for automotive vehicles provided with an internal combustion engine having cylinders and a throttle controlled suction passage, comprising in combination a plurality of brake mechanisms, a plurality of power actuators, each having a cylinder closed at both ends and a piston in the cylinder, controlling valve mechanism for all of said actuators located exterior to said cylinders, and comprising a movable valve casing connected with all of said cylinders, valves movable with respect to the casing, and a valve actuating part movable with and with respect to said casing, means for connecting all of said actuator cylinders simultaneously with the suction passage of the engine and with the source of higher fluid pressures under the control of said valve mechanism, means for connecting each piston with certain independently operable brake mechanisms of the vehicle, an operator operated part, the valve actuating part and valve casing being the one connected with the operator operated part and the other with certain of said brake mechanisms less than the whole number, and means for limiting the relative movement between the valve actuating part and the valve casing, to enable the operator to apply all of said brake mechanisms simultaneously by power, and to add his physical force to the brake mechanisms only which are connected with said valve mechanism.

13. A brake system for automotive vehicles provided with an internal combustion engine having cylinders and a throttle controlled suction passage, comprising in combination a plurality of brake mechanisms, a plurality of power actuators, each having a cylinder closed at both ends and a piston in the cylinder, controlling valve mechanism for all of said actuators located exterior to said cylinders, and comprising a movable valve casing connected with all of said cylinders, valves movable with respect to the casing, and a valve actuating part movable with and with respect to said casing, means for connecting all of said actuator cylinders simultaneously with the suction passage of the engine and with the source of higher fluid pressures under the control of said valve mechanism, means for connecting each piston with certain independently operable brake mechanisms of the vehicle, an operator operated part, the valve actuating part and valve casing being the one connected with the operator operated part and the other with certain of said brake mechanism less than the whole number, and means for limiting the relative movement between the valve actuating part and the valve casing, to enable the operator to apply all of said brake mechanisms simultaneously by power, and to add his physical force to the brake mechanisms only which are connected with said valve mechanism, means for arresting said valve mechanism in released position so as to maintain a connection between the suction passage of the engine and each of said cylinders on each side of the piston therein, to maintain said piston submerged in vacuum.

14. A brake system for automotive vehicles deriving a source of power from the suction passage of the internal combustion engine and comprising a plurality of independent brake mechanisms, a corresponding number of power actuators for operating said brake mechanisms, and a single valve mechanism separated from each of said power actuators for controlling fluid pressure to all of said actuators, a connection between a part of the valve mechanism and a movable part of one of the actuators, an operator operated part, a connection between another part of the valve mechanism and the operator operated part whereby when the operator operated part is actuated all brake mechanisms will be applied by power and the operator may add his physical force to the brake mechanisms connected with the operator operated part and may apply such brake mechanisms in case of failure of power.

15. For use with an automotive vehicle, power operating mechanism therefor comprising a cylinder and a piston therein, valve mechanism for the cylinder exterior thereto comprising a valve casing and a plurality of valves in said casing, means for subjecting the piston to differing pressures under the control of said valve mechanism, an operator operated part, operative connections therefrom to said valves and means for arresting a portion of the valve mechanism in a predetermined position when the piston is in its retracted position so as to hold certain of said valves open.

16. For use with an automotive vehicle provided with an internal combustion engine having a suction passage power operated mechanism comprising an actuating cylinder and a double acting piston therein, reversing valve mechanism including a casing and valves exterior to the actuator cylinder, a suction pipe for connecting the valve casing with the suction passage of the engine, means for admitting a higher pressure fluid to the valve casing, and means for holding the valves normally in position to connect the suction pipe with the actuator cylinder on both sides of the piston.

17. For use with an automotive vehicle provided with an internal combustion engine having a suction passage, power operating mechanism therefor comprising a cylinder and a piston therein, an operating member, a part to be operated, means for connecting said piston and said part to be operated, a longitudinally movable valve casing, movable valves in said casing, means for connecting said cylinder with the suction passage of the engine under the control of said valve mechanism, a valve actuating part extending through the valve casing and valves, the valve actuating part being connected with the valve casing by means permitting lost motion the valve actuating part and the valve casing being the one connected to the part to be operated and the other connected to the operating member.

18. For use with an automotive vehicle provided with an internal combustion engine having cylinders and having a throttle controlled suction passage, a power operating mechanism therefor comprising an actuator cylinder, a piston therefor, valve mechanism for said actuator located exterior thereto, means for connecting said actuator cylinder with the suction passage of the engine between the throttle valve and the engine cylinder and with a source of higher fluid pressure under the control of said valve mechanism, said valve mechanism comprising relatively movable parts, an operator operated part connected with one of said relatively movable parts, connections from the other of said parts to an apparatus of said vehicle to be operated for enabling the operator to apply his physical force thereto, connections from a movable part of the power operating mechanism to said apparatus, and means for holding the valve mechanism when in released position to connect said actuator cylinder simultaneously and on both sides of the piston therein with the suction passage of the engine to maintain said piston submerged in vacuum.

19. For use in an automotive vehicle, a power operating mechanism including a motor, a manually operable member and a part to be moved by said motor and said member, mechanical connections between said member and said part, a tension device interposed in said connections having relatively movable parts with a set of outlet passages and a set of inlet passages for controlling the motor, the parts being relatively formed to be attached to oppositely extending elements of said connections, a passage leading to said motor, a spring urging said parts in a direction to connect one of said sets of passages with the motor passage and overcome by tension to connect the other set of passages and the motor passage, and a separate connection between the motor and the part to be moved.

20. A brake system for an automotive vehicle comprising a power actuator having a cylinder and a piston therein, a plurality of brake mechanisms, a shaft operatively connected with said brake mechanisms, a pair of arms secured to said shaft, a direct connection between said piston and one of said arms, controlling valve mechanism for the actuator located exterior to the cylinder thereof, and comprising a valve casing movable with respect to the cylinder, and valves in said valve casing movable with respect thereto from a power applying position through a lapped position to a power off position and in the opposite direction, means for subjecting the opposite faces of the actuator piston to differential pressures under the control of said valve mechanism, a separate direct connection from said valve casing to the other of said shaft arms, whereby, as above stated, the valve casing is operatively connected with the piston and moves with said brake mechanism, an operator operated part, operative connections from said part to the valves, having a part movable with respect to and also movable with the valve casing.

21. A brake system for an automotive vehicle provided with an internal combustion engine having a suction passage comprising a power actuator having a cylinder and a piston therein, a plurality of brake mechanisms, a shaft operatively connected with said brake mechanisms, a direct connection between said piston and said shaft for rotating said shaft, reversing valve mechanism for the actuator comprising a valve casing exterior to the cylinder operatively connected to the shaft and movable longitudinally with respect to the cylinder, movable valves in said casing, and yielding means normally tending to seat said valves, means for connecting said actuator cylinder with the suction passage of the engine, and with the atmosphere under the control of said valve mechanism, an operator operated part, a valve actuating part connected therewith and extending longitudinally through the valve casing and connected with said valves, means for arresting the valve casing when the actuator piston is in retracted position, and means for holding said valves in position to connect the actuator cylinders on both sides of the piston with said suction passage whereby the piston may be actuated to apply the brake mechanism, without admitting appreciable quantities of air to said suction passage, and connections between the operator operated part and the brake mechanism including a provision for lost motion sufficient to insure the operation of the valve mechanism whereby the operator may apply his physical force to the movable part in addition to the actuator or in case of failure of power.

22. A brake system for an automotive vehicle comprising a power actuator having a cylinder and a piston in said cylinder, a brake mechanism, a shaft operatively connected with said brake mechanism, a direct connection from the piston to the shaft whereby the shaft may be rotated, an operator operated part, connections from said operator operated part to the shaft, a valve mechanism for said actuator interposed in the connection between the operator operated part and the shaft connected therewith and including a longitudinally movable valve casing, movable valves for controlling said actuator, and a part connected with said valves and having a limited amount of longitudinal movement with respect to the valves and valve casing and forming a part of the connections between the operator operated part and the shaft connected therewith.

23. Brake operating mechanism comprising, in combination, brakes, a rotatable shaft operatively connected with said brakes, to apply the same, two separate connections to said shaft, power means for operating one connection, manual means for operating the other connection including a controlling member, and means for controlling the power of the power means which comprises a valve movable from a power applying position through a lapped position to a power off position and in the opposite direction and which is operated partly by the controlling member and partly by the manual connection to the shaft.

24. Brake mechanism comprising, in combination, friction parts, an operating device operatively connected to said friction parts for operating the same, two separate connections to said device, power means for operating one connection, manually operated means for operating the other connection including a controlling member, a connection to the controlling member, and means for controlling the power of the power means comprising a valve exterior to the power means having relatively movable parts and forming a force transmitting element in said connections and operated by the application of force to said connection, said valve parts being movable from a power applying position through a lapped position to a power off position and in the opposite direction and being operated partly by said connection to the controlling member and partly by the other of the connections to said operating device.

25. Brake operating mechanism comprising, in combination, with a brake mechanism to be operated, a rotatable shaft operatively connected with said brake mechanism, manually operated means for rotating said shaft, said manually operated means comprising the brake applying pedal, a force transmitting means connecting said manually operated means and said shaft, and a valve for controlling said power means interposed in and supported by said force transmitting means, said valve being exterior to said power means and having a part operated by movement of said manually operated means for energizing or deenergizing said power means and having a relatively movable part operated by rotation of said shaft whereby said valve parts are movable to and from positions in which the power is applied, the valve is lapped and the power is released.

26. Brake operating mechanism comprising, in combination, with a brake mechanism to be operated, power means, a rotatable shaft operatively connected with said brake mechanism, manually operated means for rotating said shaft, said manually operated means comprising the brake applying pedal, a force transmitting means connecting said manually operating means and said shaft, a valve for controlling said power means interposed in said force transmitting means, said control valve comprising a pair of members having a spring interposed between them and both normally urged by said spring to closed position, and means associated with said member for moving either one of said members and only one of said members at a time from its seat.

27. For use with an automotive vehicle provided with an internal combustion engine having a suction passage, power operated mechanism comprising an actuating cylinder and a double acting piston therein, reversing valve mechanism exterior to the actuator cylinder, a suction pipe for connecting the valve casing with the suction passage of the engine, means for admitting a higher pressure fluid to the valve casing, and adjustable means for holding the valves normally in position to connect the suction pipe with the actuator cylinder on both sides of the piston.

28. In brake mechanisms for motor vehicles, brakes, a system of connected elements which includes an operating lever, an operating link connected to said lever and to said brakes for manually applying the brakes with a lost motion connection, a fluid pressure motor for operating the brakes and having an operative connection therewith, a valve for controlling the operation of the motor, said valve being supported by the operating link between the operating lever and the brakes and having a connection with the operating lever of the brake system so that initial movement of said lever in the direction to apply the brakes will operate the valve to energize the fluid pressure motor.

29. In brake mechanism for motor vehicles, brakes; a system of connected elements which includes an operating lever, an operating link connected to said lever, and linkage connected to said brakes and said link for manually applying the brakes with a lost motion connection; a fluid pressure motor for operating the brakes and having an operative connection therewith; a source of fluid pressure lower than atmospheric; a fluid connection between said fluid pressure motor and said source; and a valve interposed in and controlling the fluid connection between said fluid pressure motor and said source, the said valve having means to close said fluid connection and at the same time to connect said motor with a source of higher fluid pressure, to open said fluid connection and at the same time to disconnect said motor from the source of higher fluid pressure, or to close said fluid connection and at the same time to disconnect said motor from the source of higher fluid pressure whereby said motor is controlled to apply, hold, or allow the release of said brakes, and said valve being supported by the operating link and said linkage between the operating lever and the brakes and being connected to and movable with the operating link and linkage and having movable parts including a movable member mechanically connected to the operating lever of the brake system so that initial movement of said lever in the direction to apply the brakes will actuate the valve.

30. A brake operating mechanism comprising, in combination with a plurality of brake mechanisms; power means for operating said brake mechanisms comprising a plurality of power actuators, each associated with one of said brake mechanisms and each having a cylinder and piston therein; a source of suction; a connection between a movable part of each of said actuators and its associated brake mechanism; and manually operated means for applying at least one of said brake mechanisms, said manually operated means comprising a brake pedal, and means interconnecting said pedal and brake mechanism including a controlling valve mechanism, operable with operation of the brake pedal and the brake mechanism arranged exterior to both of said power actuators, to control the operation of the power means; said valve mechanism being effective when the pedal is moved in one direction to connect one end of one of said cylinders with said source of suction and one end of a second cylinder with a source of pressure higher than the pressure of said source of suction, but effective when said pedal is moved in the other direction to connect said end of the first-named cylinder with said source of higher pressure and to connect said end of the second-named cylinder with said source of suction.

31. A brake system for an automotive vehicle comprising brakes, a brake actuating member, a power actuator having relatively movable elements including a power element, a source of power fluid, a force transmitting connection in power fluid, a force transmitting connection interconnecting said power element and brake actuating member, an operator operated part and a second force transmitting connection separate from said first mentioned force transmitting connection, said second connection operating in tension and interconnecting said operator operated part with said brake actuating member, said second mentioned connection comprising a controlling valve mechanism for said actuator including two relatively movable parts, one of said parts being connected to the operator operated part and the other of said parts being connected to the brake actuating member, said valve parts being constructed to provide a release passage and fluid transmitting ports one connected to said power actuator and one to said source of power fluid and said valve parts being capable of isolating the actuator port from the power source port and also at the same time isolating said actuator port from said release passage to hold said brakes applied and said valve parts being also so arranged with respect to each other that with relative movement of said valve parts caused by relative movement of the operator operated part and brake actuating member, to control said power fluid, there is provided a follow-up operation of the valve mechanism to effect a graduated application of the brakes by power, depending upon the position of the operator operated part, and said system also including resilient means arranged upon release of the operator operated part to move said valve parts relatively to a position in which the valve controls the supply of power fluid to the actuator so that the brakes are released.

32. A brake system for an automotive vehicle comprising, in combination, brakes, a brake actuating member, a power actuator having relatively movable elements including a power element, a source of power fluid, a force transmitting connection between said power element and brake actuating member, a brake pedal, force transmitting means separate from and independent of said aforementioned force transmitting connection, said means operating in tension and interconnecting said brake pedal with a part of said brake actuating member remote from the aforementioned connection with said brake actuating member, said means having interposed therein as a tension element a controlling valve mechanism for said actuator including relatively movable parts, one of said parts being connected by an element extending in one direction to the brake pedal and the other of said parts being connected by an oppositely extending element to the brake actuating member, said valve parts being constructed to provide a fluid transmitting passage arranged to be connected to said motor to apply the brakes and a fluid transmitting passage arranged to be connected to said motor so that the brakes are released, and said valve parts being capable of closing both of said passages to hold the brakes applied, and said passages being so arranged with respect to each other that with relative movement of said valve parts caused by relative movement of the operator operated part and brake actuating member, to control said power fluid, there is provided a follow-up operation of the valve mechanism to graduate the application of the brakes by power, depending upon the position of the pedal in its arc of throw, and a spring urging said parts in a direction to open the release passages and overcome by tension to open the power applying passages, said valve parts being further provided with interengaging stop means whereby the brakes may be applied either by the physical effort of the operator to aid the power operation of the brakes or exclusively by the physical effort of the operator in the event of the failure of the power mechanism.

CALEB S. BRAGG.
VICTOR W. KLIESRATH.